US011009102B2

(12) United States Patent
Steffens et al.

(10) Patent No.: US 11,009,102 B2
(45) Date of Patent: May 18, 2021

(54) RANGE-CHANGE TRANSMISSION DEVICE

(71) Applicant: DAIMLER AG, Stuttgart (DE)

(72) Inventors: Frank Steffens, Ostfildern (DE); Detlef Schnitzer, Denkendorf (DE); Ingo Pfannkuchen, Friedrichshafen (DE); Jens Luckmann, Winnenden (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/639,447

(22) PCT Filed: Jun. 25, 2018

(86) PCT No.: PCT/EP2018/066879
§ 371 (c)(1),
(2) Date: Feb. 14, 2020

(87) PCT Pub. No.: WO2019/034310
PCT Pub. Date: Feb. 21, 2019

(65) Prior Publication Data
US 2021/0025481 A1 Jan. 28, 2021

(30) Foreign Application Priority Data
Aug. 16, 2017 (DE) ...................... 10 2017 007 763.0

(51) Int. Cl.
*F16H 37/04* (2006.01)
*F16H 3/66* (2006.01)
*F16H 3/093* (2006.01)

(52) U.S. Cl.
CPC ............ *F16H 3/66* (2013.01); *F16H 37/046* (2013.01); *F16H 2003/0931* (2013.01); *F16H 2200/201* (2013.01); *F16H 2200/2043* (2013.01)

(58) Field of Classification Search
CPC ................. F16H 37/046; F16H 37/042; F16H 2037/047; F16H 2037/048; F16H 2200/2007
See application file for complete search history.

(56) References Cited

U.S. PATENT DOCUMENTS 8,051,732 B2    11/2011    Gitt
8,360,923 B2 *   1/2013    Kraynev ............... F16H 37/042
                                                              475/277
(Continued)

FOREIGN PATENT DOCUMENTS

DE    102012218367 A1    4/2014
DE    102013202045 A1    8/2014
(Continued)

OTHER PUBLICATIONS

International Search Report dated Oct. 16, 2018 in related/corresponding International Application No. PCT/EP2018/066879.
(Continued)

*Primary Examiner* — Sherry L Estremsky
(74) *Attorney, Agent, or Firm* — Patent Portfolio Builders PLLC

(57) ABSTRACT

A range-change transmission device includes an input shaft, an intermediate shaft, a countershaft, a transmission output shaft, and a first planetary gear set. A first transmission element of the first planetary gear set is permanently coupled to the intermediate shaft in a rotationally fixed manner. A second transmission element of the first planetary gear set is coupled to the transmission output shaft. A first switching unit is provided to arrange a third transmission element of the first planetary gear set to be fixed to the housing in at least one switching position. The range-change transmission device also includes a second planetary gear set. A third transmission element of the second planetary gear set is
(Continued)

Figure 1:
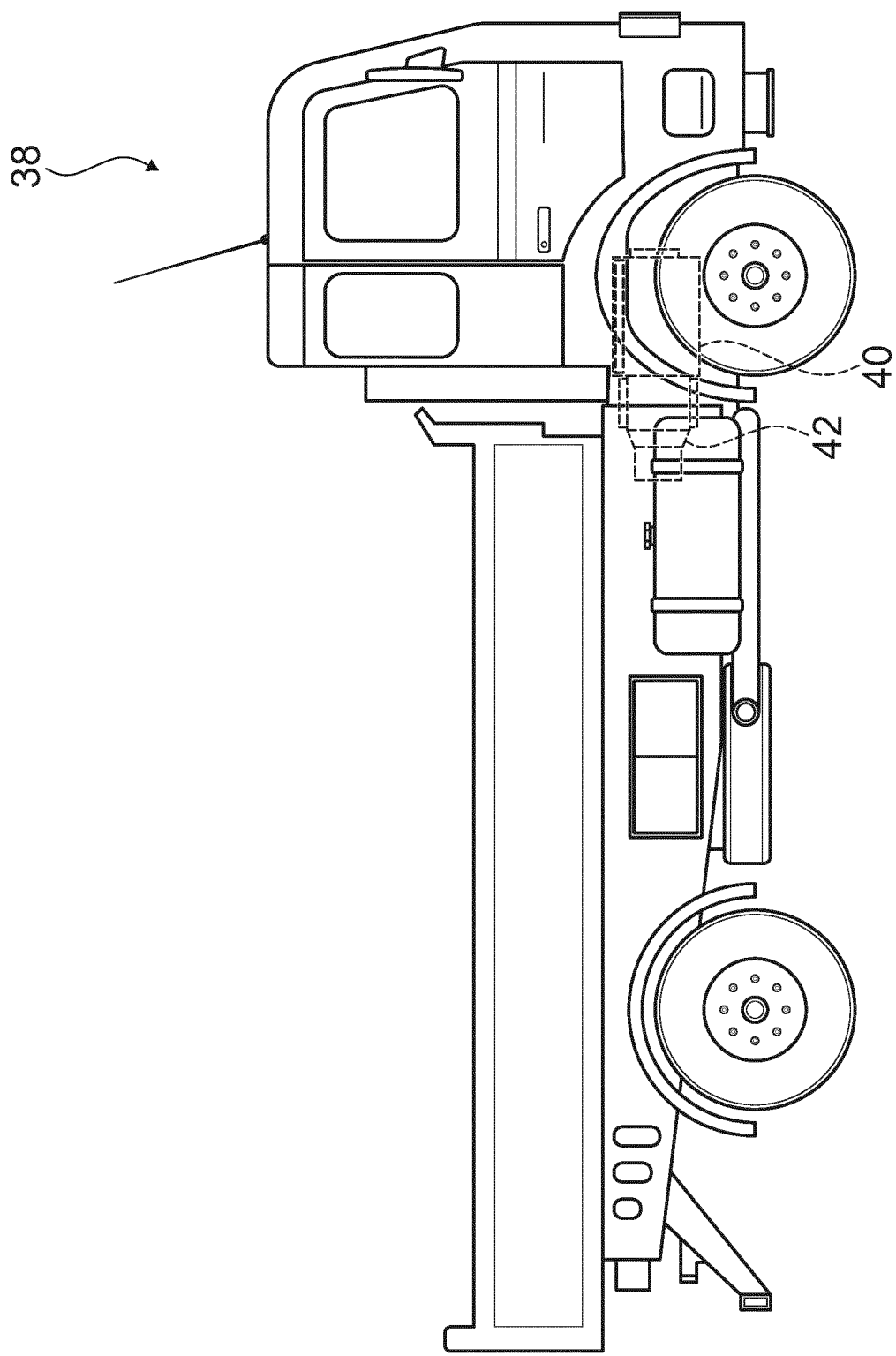

permanently coupled to the intermediate shaft in a rotationally fixed manner.

16 Claims, 3 Drawing Sheets

(56) References Cited

U.S. PATENT DOCUMENTS

| | | | |
|---|---|---|---|
| 8,961,345 B2 | 2/2015 | Kaltenbach et al. | |
| 9,334,930 B2 | 5/2016 | Kaltenbach | |
| 9,488,260 B2 | 11/2016 | Kaltenbach et al. | |
| 10,493,838 B2 * | 12/2019 | Kaltenbach | F16H 37/046 |
| 10,576,814 B2 * | 3/2020 | Bergquist | B60K 6/445 |

FOREIGN PATENT DOCUMENTS

| | | | | |
|---|---|---|---|---|
| EP | 2899428 A1 | | 7/2015 | |
| JP | 2007138978 A | * | 6/2007 | F16H 37/042 |
| WO | 2007031193 A1 | | 3/2007 | |
| WO | 2016053167 A1 | | 4/2016 | |

OTHER PUBLICATIONS

Office Action created on Jan. 22, 2018 in related/corresponding DE Application No. 10 2017 007 763.0.
Written Opinion dated Oct. 16, 2018 in related/corresponding International Application No. PCT/EP2018/066879.

* cited by examiner

Fig. 3

| Gang | B | | S1 | | | S2 | | | S3 | | | S4 | | | S5 | | |
|---|---|---|---|---|---|---|---|---|---|---|---|---|---|---|---|---|---|
| | B0 | B1 | S11 | S1N | S12 | S21 | S2N | S22 | S31 | S3N | S32 | S41 | S4N | S42 | S51 | S5N | S52 |
| G1 | X | | | | X | X | | | | X | | X | | | X | | |
| G2 | X | | | | X | X | | | | X | | | | X | X | | |
| G3 | X | | | | X | | | X | | X | | | X | | X | | |
| G4 | | X | | | X | | X | | | X | | | X | | X | | |
| G5 | X | | X | | | X | | | X | | | | X | | X | | |
| G6 | X | | X | | | X | | | | X | | X | | X | X | | |
| G7 | X | | X | | | X | | X | | X | | | X | | X | | |
| G8 | | X | X | | | | X | | | X | | | X | | X | | |
| G9 | X | | X | | | | X | | | X | | | X | | X | | |
| G10 | X | | X | | | X | | | | | X | X | X | | | | X |
| G11 | X | | X | | | X | | | | X | | | | | | | X |
| G12 | X | | X | | | X | | | | X | | | | X | | | X |
| G13 | X | | X | | | | | X | | X | | | X | | | | X |
| G14 | | X | X | | | | X | | | X | | | X | | | | X |

RANGE-CHANGE TRANSMISSION DEVICE

BACKGROUND AND SUMMARY OF THE INVENTION

Exemplary embodiments of the invention relate to a range-change transmission device, in particular a power-shiftable transmission, particularly preferably a power-shifted constant mesh transmission.

Range-change transmission devices, in particular power-split transmissions, for commercial vehicles having a rear-mounted assembly in constant mesh constructions, are already known. Switching between the gears created by the gear wheels is possible in a non-disruptive manner in terms of load by means of a front-mounted assembly and combined gear wheels. Analogously to double-coupled transmissions, switching beyond a gear group is not possible without great effort. DE 10 2012 218 367 A1 and DE 10 2013 202 045 A1 both generally disclose such a range-change transmission device.

WO 2007/031193 A1 discloses a range-change transmission device having an input shaft, having an intermediate shaft, having a countershaft, having a transmission output shaft and having a planetary gear set. A first transmission element of the planetary gear set is permanently coupled in a rotationally fixed manner to the intermediate shaft. A second transmission element of the planetary gear set is permanently coupled in a rotationally fixed manner to the transmission output shaft. A third transmission element of the planetary gear set can be arranged to be fixed on the housing or can be coupled to the transmission drive shaft.

Such a range-change transmission devices are known from EP 2 899 428 A1 and the generic WO 2016053167 A1, which, moreover, have a second planetary gear set, by which an element can be coupled to the countershaft.

Exemplary embodiments of the invention are directed to a range-change transmission device having improved power-shiftability.

According to exemplary embodiments, a range-change transmission device includes an input shaft, an intermediate shaft, a countershaft, a transmission output shaft, and a first planetary gear set, wherein a first transmission element of the first planetary gear set is permanently coupled to the intermediate shaft in a rotationally fixed manner, wherein a second transmission element of the first planetary gear set is coupled to the transmission output shaft, and wherein a first switching unit is provided to, in at least one switching position, arrange a third transmission element of the first planetary gear set to be fixed to the housing.

Furthermore, it is assumed that the range-change transmission device has a second planetary gear set, wherein a third transmission element of the secondary planetary gear set is coupled or can be coupled to the intermediate shaft.

The term "coupled" is intended to mean that an element of the range-change transmission device, such as a shaft or a gear, for example, is indirectly or directly connected to another element in manner transferring the torque. The term "rotationally fixed" or the term "rotationally fixed coupling of the one and the other element" is intended to mean that the one element and the other element are arranged coaxially to each other and are fixedly connected to each other in such a way that the one element and the other element rotate during the state of the rotationally fixed coupling at the same angle speed.

Yet a coupling can also be depicted by one or more toothing intrusions or by a transformation ratio step. The term "coupled" thus generally describes a connection, via which a torque can be transferred. In contrast, the term "permanently coupled in a rotationally fixed manner" is limited to a permanently rotationally fixed connection between two elements.

Here, the input shaft is provided for indirect or direct attachment to a combustion engine. Here, the transmission output shaft is provided for indirect or direct attachment to a drive wheel of a motor vehicle.

According to an aspect of the invention, a first transmission element of the second planetary gear set can be coupled to the third transmission element of the first planetary gear set via the countershaft in such a way that a torque, which is to be introduced from the first transmission element of the second planetary gear set via the countershaft into the first planetary gear set, is channeled out of the second planetary gear set at the first transmission element of the second planetary gear set and is introduced into the first planetary gear set at the third transmission element of the first planetary gear set. In doing so, a switch without interrupting the load between gears of different gear groups can advantageously be possible. In order to make this coupling possible, the range-change transmission device has at least one further switching unit.

The arrangement in such a way that a torque can be channeled out of the second planetary gear set at the first transmission element of the second planetary gear set and can be introduced from there via the countershaft at the third transmission element of the first planetary gear set into the first planetary set, is essential for the invention. It is further essential that the first transmission element of the second planetary gear set is the element which is not or cannot be coupled to the intermediate shaft in a rotationally fixed manner and which is also not coupled or cannot be coupled to the intermediate shaft in rotationally fixed manner. In contrast, it is not essential to the invention whether the first transmission element of the second planetary gear set is a sun wheel or a hollow wheel or a planetary carrier. It is known to the person skilled in the art that, with a planetary transmission, the attachment of the elements sun wheel, hollow wheel, planetary carrier, for generating kinematically equivalent whole systems can be swapped.

Furthermore, it is essential for the invention that a moment starting from the countershaft on the element of the first planetary gear set can be introduced into the first planetary gear set, which is not coupled or not able to be coupled to the intermediate shaft in a rotationally fixed manner and also is not coupled or not able to be coupled to the output shaft of the first planetary gear set in a rotationally fixed manner. Here, it is initially not significant whether the third transmission element of the planetary gear set is formed as a hollow wheel or as a planetary carrier or as a sun wheel.

As a result of the device according to the invention, the switching without interrupting the load between gears of different gear groups is advantageously possible.

Here, the first transmission element of the second planetary gear set is particularly advantageously coupled or can be coupled to the countershaft by means of exactly one first transformation ratio step, and the countershaft is coupled or can be coupled to the third transmission element of the first planetary gear set via exactly one second transformation ratio step. In this way, the switchability without interrupting the load between gears of different gear groups can be featured particularly easily and thus robustly, cost-effectively and without friction.

As a result of the embodiment of the range-change transmission device according to the invention, an advantageously good load switchability is provided, in particular. Preferably, a permanently load-switchable constant mesh transmission within a gear group and/or preferably between different gear groups can be implemented by means of the invention. Particularly preferably, a switching without interrupting the load between a lowest gear of a first gear group, in particular high range, and a highest gear of a second gear group, in particular low range, can be achieved.

Preferably, an additional attrition-free starting gear can be generated. Furthermore, a quick switching via a rear-mounted assembly can be implemented without synchronizations and/or lamella couplings. Furthermore, a modular transmission can be advantageously constructed, in particular by a deft combination of several rear-mounted assemblies. A compact construction can be achieved particularly advantageously. Preferably, an optimization of a combustion engine and/or particularly preferably a combination of a combustion engine with an electric engine, in particular as a hybrid transmission, can be made possible. Furthermore, electric driving is particularly preferably possible. Furthermore, a towing power can be reduced and/or efficient down-speeding can be achieved.

"Range-change transmission device" is to be understood, in particular, as at least one part of a range-change transmission. Alternatively, the range-change transmission device can completely form the range-change transmission. The range-change transmission device has, in particular, one main transmission, preferably a main group, which preferably comprises an intermediate shaft. However, it would also be conceivable that the main group is free from an intermediate shaft. The main group can comprise, in particular, a plurality of gears. Preferably, the main assembly is provided for switching a plurality of gears. Advantageously, the range-change transmission device has at least one reducing transmission, particularly advantageously at least two reducing transmissions and particularly preferably a range group and a front-mounted group. Preferably, the range-change transmission device, in particular for HGVs, in particular with a design as a power split group transmission device for allocating a driving moment onto a main shaft and onto at least one countershaft, is provided, wherein the countershaft is recoupled to the main shaft on one end. Preferably, one of the paths has switchable gears, wherein the path with the switchable gears has, in particular, means for reducing or increasing the torque of this route. Preferably, at least one switchable gear and/or its path can be made free from torque via the means, while the other route still transfers the torque. In doing so, a gear switching, in particular, can be made possible without interrupting the torque. "Provided" is to be understood, in particular, as specially designed and/or equipped. The fact that an object is to be provided for a particular function is to be understood to mean that the object fulfils and/or carries out this particular function in at least one usage and/or operating state.

A "planetary gear set" is to be understood, in particular, as a unit of a planetary transmission having a transmission element formed as a sun wheel, having a transmission element formed as a hollow wheel, having a transmission element formed as a planetary gear carrier and having several transmission elements formed as planetary gears, wherein the transmission elements formed as planetary gears of the transmission element formed as a planetary gear carrier are arranged on a circular orbit around the transmission element formed as a sun wheel. "Planetary transmission" is to be understood, in particular, as a unit having at least one planetary gear set, preferably having exactly one planetary gear set. Alternatively, or additionally, the planetary transmission can be formed having multiple stages and can preferably comprise several planetary gear sets.

In particular, a "switching unit" is to be understood as a unit having at least two coupling elements and at least one switching element, which is provided to produce a switchable connection between the at least two coupling elements. Preferably, the switching unit is formed from a switching unit having three coupling elements. A "switching element" of a switching unit is to be understood, in particular, as an element that is preferably formed to be axially shiftable and, in at least one operating state, in particular in at least one switching position of the switching unit, is provided for a rotationally fixed coupling of the at least two coupling elements. A "coupling element" is to be understood, in particular, as an element of the switching unit permanently connected to a transmission element, such as a transmission shaft, an idling wheel, a fixed wheel and/or an axle, for example, in a rotationally fixed manner, the element preferably being axially and radially fixed and being provided, in particular, for a frictionally engaged, force-fit and/or positive locking connection to the switching element, such as an idling wheel, for example, which has a toothing for connecting to the switching element. A "switching unit having three coupling elements" is to be understood, in particular, as a switching unit, in which the switching element is provided to connect a coupling element, in particular an inner coupling element, switchably to respectively at least one of the two other coupling elements or to decouple from these.

Furthermore, it is proposed that the range-change transmission device has a braking unit, which is provided to arrange the first transmission element of the second planetary gear set to be fixed to the housing. The braking unit can be formed, for example, by a toothing fixed to the housing. However, in principle, other formations of the braking unit that seem useful to the person skilled in the art are also conceivable. As a result, an advantageous switchability of the range-change transmission device can be achieved.

According to a further development, the range-change transmission device has a moment adjustment unit, which is coupled to the first transmission element of the second planetary gear set or can be coupled by means of a sixth switching unit in such a way that a torque starting from the moment adjustment unit on the first transmission element of the second planetary gear set can be introduced into the second planetary gear set. In this way, a rotational frequency of the first transmission element of the second planetary gear set can be influenced by means of the moment adjustment unit and thus can carry out changing gear without interrupting the load. With this development, it is essential that the moment adjustment unit can introduce a torque on the transmission element into the second planetary gear set, which is coupled or can be coupled to the input shaft in a non-rotationally fixed manner or to the intermediate shaft in a rotationally fixed manner.

According to a further development, the moment adjustment unit can be coupled to the countershaft via the sixth switching unit and, particularly preferably, additionally via an idling wheel of the intermediate shaft.

A "moment adjustment unit" is to be understood, in particular, as a unit which is provided in at least one operating state for changing a transferred moment. Preferably, the moment adjustment unit can be provided for reducing and/or for increasing a transferred moment. Preferably, the moment adjustment unit is provided in a starting process and/or during a switching process for a change, in particular for a step-free change, of a transformation ratio of the range-change transmission device. Preferably, the moment adjustment unit is provided in at least one operating state for reducing and/or increasing a transferred moment, advantageously in order to receive at least one switchable gear free from a torque.

Particularly preferably, the moment adjustment unit has an electric engine or a hydraulic pump or a retarder or a friction brake or a combination of these. In one embodiment of the moment adjustment unit as an electric engine, the electric engine can be operated as a generator for the purposes of a braking effect. As a result, a constant mesh transmission that can be constantly power-shafted can advantageously be made possible.

In addition, it is proposed that the range-change transmission device has a second switching unit, which is provided to couple the first transmission element of the second planetary gear set to the countershaft in at least one switching position, in particular a first switching position of the second switching unit, in such a way that a torque starting from the second planetary gear set on the first transmission element of the second planetary gear set can be channeled and transferred to the countershaft. In doing so, a switchable power split function can advantageously be achieved. Furthermore, an advantageously good power shiftability can be provided.

Moreover, it is proposed that the second switching unit is provided to interlock the second planetary gear set in at least one further switching position, in particular a second switching position of the switching unit. To do so, the second switching unit can be designed in two parts, wherein a first part is formed for coupling the first transmission element of the second planetary gear set to the countershaft, and a second planetary gear set is formed for interlocking the second planetary gear set.

Here, the second switching unit is particular advantageously formed as a double switching unit, wherein the first part and the second part are arranged adjacently.

In particular, the second switching unit is provided to couple the first transmission element of the second planetary gear set to a second transmission element of the second planetary gear set in a rotationally fixed manner in the second switching position of the second switching unit. In doing so, a direct drive can advantageously be provided.

Moreover, it is proposed that the range-change transmission device has a third switching unit, which is provided to couple the countershaft to the third transmission element of the first planetary gear set in such a way that a torque starting from the countershaft on the third transmission element of the first planetary gear set can be introduced into the third planetary gear set. To do so, the third switching unit can be arranged coaxially to the countershaft or also coaxially to the first planetary gear set.

It is proposed as being particularly advantageous that the third switching unit has a first switching gear arranged permanently rotationally fixed and axially shiftably on the countershaft. In addition, it is proposed that the third transmission element of the first planetary gear set is permanently coupled to a second switching gear in a rotationally fixed manner, with which the first switching gear can engage. As a result, a good power shiftability can advantageously be achieved. Furthermore, a quick switching can advantageously be achieved via a rear-mounted group without phasings and/or lamella couplings.

Furthermore, it is proposed that the second switching unit is arranged axially in front of the second planetary gear set, when viewed in a moment flow direction. In particular, the second switching unit is arranged axially behind a second gear plane, when viewed in the moment flow direction. "Moment flow direction" is to be understood, in particular, as a direction of a transfer of a torque by means of the range-change transmission device. Advantageously, the moment flow direction runs axially from a transmission input side to a transmission output side.

In addition, it is proposed that the braking unit is arranged axially in front of the second switching unit, when viewed in the moment flow direction. The braking unit is advantageously arranged axially behind a coupling, in particular a power shifting coupling, when viewed in the moment flow direction. Furthermore, the braking unit is advantageously arranged axially in front of a first gear plane in the moment flow direction.

Furthermore, it is proposed that the first switching unit is arranged axially between the first planetary gear set and the second planetary gear set. In particular, the first switching unit is arranged axially in front of the sixth gear plane, when viewed in the moment flow direction, and/or behind a fifth gear plane. In doing so, an advantageous range-change transmission device can be provided, in particular. A compact construction can advantageously be achieved.

Moreover, it is proposed that the first switching unit is provided to interlock the first planetary gear set, in at least one further switching position, in particular a first switching position of the first switching unit. To do so, the first switching unit can be formed in two parts, wherein a first part is formed for arranging the third transmission element of the first planetary gear set to be fixed to the housing, and a second part is formed for interlocking the first planetary gear set. Here, the first part and the second part can advantageously be arranged adjacently to each other, such that the first switching unit is advantageously formed as a double switching element.

In particular, the first switching unit is provided to couple the first transmission element of the first planetary gear set to the third transmission element of the first planetary gear set in a rotationally fixed manner in the first switching position of the first switching unit.

In one development of the invention, the first switching element is formed from a switching unit having three coupling elements and/or having three switching positions.

Furthermore, it is proposed that the range-change transmission device has a fourth switching unit provided to couple the intermediate shaft to the countershaft via a gear pair in at least one switching position.

Particularly advantageously, the fourth switching unit is arranged coaxially to the intermediate shaft and is formed to couple a first idling wheel of the intermediate shaft, which is in permanent engagement with the fixed wheel of the countershaft, to the intermediate shaft in a rotationally fixed manner in at least one switching position, in particular a first switching position.

In addition, it is proposed that the fourth switching unit has a neutral switching position and a second switching position and is provided to couple a second idling wheel of the intermediate shaft to the intermediate shaft in a rotationally fixed manner in the second switching position. As a result, several gear ratios can advantageously be achieved.

Furthermore, it is proposed that the first transmission element of the first planetary gear set is formed as a sun wheel. Moreover, it is proposed that the second transmission element of the first planetary gear set is formed as a planetary gear carrier. Furthermore, it is proposed that the third transmission element of the first planetary gear set is formed as a hollow wheel. In addition, it is proposed that the first transmission element of the second planetary gear set is formed as a sun wheel. Furthermore, it is proposed that the third transmission element of the second planetary gear set is formed as a hollow wheel. In particular, the second transmission element of the second planetary gear set is formed as a planetary gear carrier. As a result, an advantageous power shiftability of a range-change transmission device can be achieved.

Finally, a drive train having a drive unit formed as an internal combustion engine and the range-change transmission device according to the invention is proposed, wherein a crank shaft of the internal combustion engine is permanently coupled to the input shaft of the range-change transmission device in a rotationally fixed manner, the moment adjustment unit is coupled or can be coupled to the first transmission element of the second planetary gear set, and the input shaft is permanently connected to the second transmission element of the second planetary gear set in a rotationally fixed manner.

With this proposed drive train, a starting coupling can advantageously be avoided. Therefore, this is generally possible because the drive moment starting from the combustion engine can be introduced into second planetary gear set therein via the second transmission element of the second planetary gear set, simultaneously a braking moment starting from the moment adjustment unit can be introduced into the second planetary gear set via the first transmission element of the second planetary gear set, such that a scalable starting moment can be channeled away from the second planetary gear set via the third transmission element of the second planetary gear set. In general, a drive train is thus depicted that has a particularly performant shiftability, simultaneously a driveability that can be depicted cost-effectively and a high degree of effectiveness because of a reduced weight.

BRIEF DESCRIPTION OF THE DRAWING FIGURES

Further advantages emerge from the following description of the figures. An exemplary embodiment of the invention is depicted in the figures. The figures, the description of the figures and the claims contain numerous features in combination. The person skilled in the art will expediently also consider the features individually and combine them to form further useful combinations.

Figure 2:
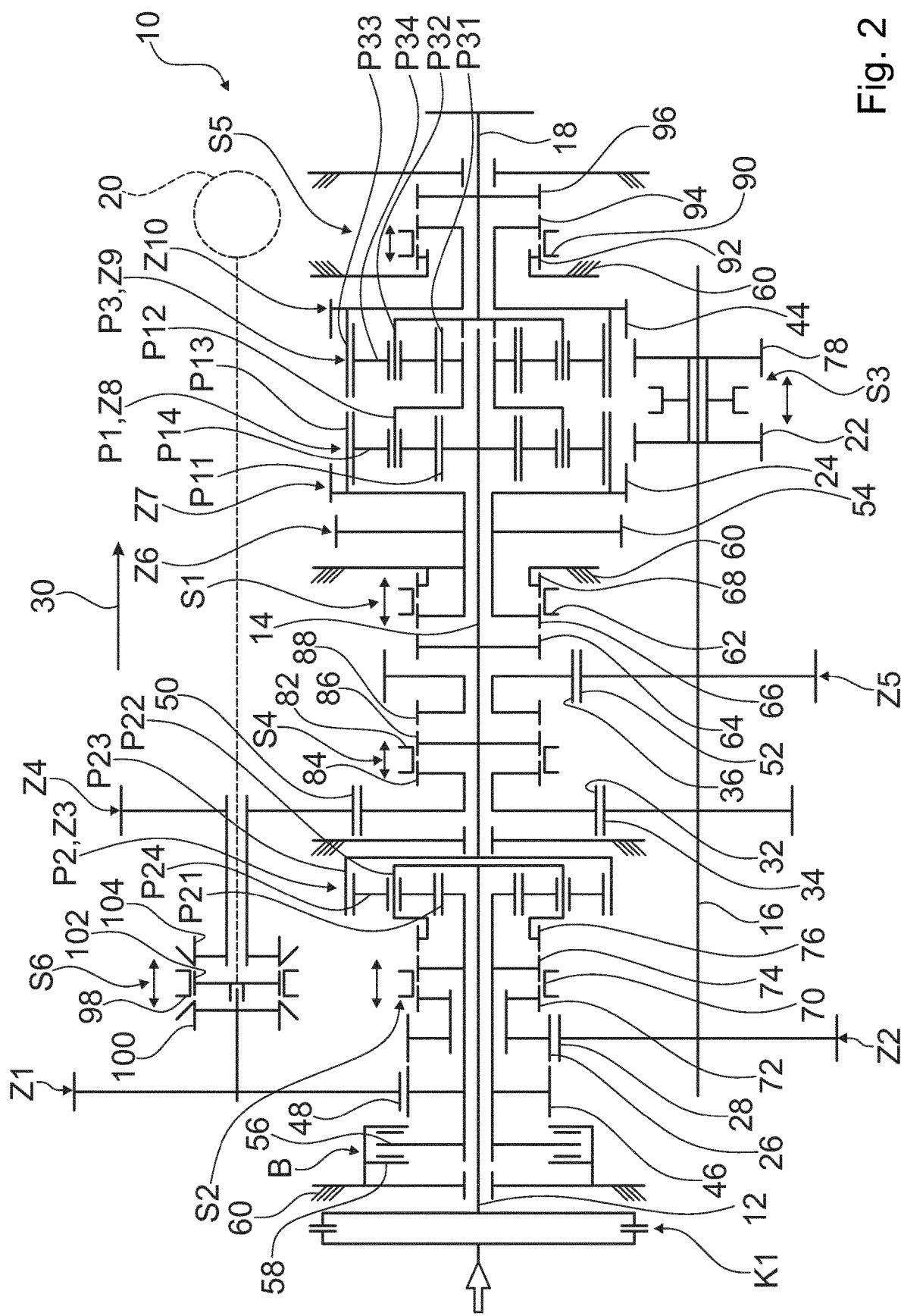

Here are shown:

FIG. 1 a motor vehicle having an internal combustion engine and having a range-change transmission device in a schematic depiction, FIG. 2 the range-change transmission device of the motor vehicle according to the invention in a schematic depiction in a first gear, and FIG. 3 a switching scheme of the range-change transmission device according to the invention.

DETAILED DESCRIPTION

FIG. 1 schematically shows a motor vehicle 38. The motor vehicle 38 is formed as a commercial motor vehicle. The motor vehicle 38 is exemplarily formed by a heavy goods vehicle. However, in principle, a different design of a motor vehicle that seems useful to a person skilled in the art would also be conceivable, for example as an omnibus, as a tractor, as a mobile crane and/or as an emergency vehicle, in particular a fire engine.

The motor vehicle 38 comprises a drive train (not illustrated in further detail), via which drive wheels of the motor vehicle 39 are driven. The drive train comprises a drive unit 40. The drive unit 40 is formed from an internal combustion engine. The drive unit 40 is formed as a combustion engine. In principle, it would also be conceivable that a drive train is formed as an electric engine and/or as a hybrid drive unit made of a combustion engine and an electric engine.

Furthermore, the motor vehicle 38 has a multiple gear transmission 42. The multiple gear transmission 42 is formed by a motor vehicle transmission. The multiple gear transmission 42 is formed by a range-change transmission. The multiple gear transmission 42 forms a part of the drive train of the motor vehicle 38. The multiple gear transmission 42 is arranged along the drive train, in particular along a flux of force of the drive train, behind the drive unit 40. The drive unit 40 has a driven crank shaft which is connected to the multiple gear transmission 42.

FIG. 2 schematically shows a range-change transmission device 10. The multiple gear transmission 42 has the range-change transmission device 10. The multiple gear transmission 42 is formed by the range-change transmission device 10. The range-change transmission device 10 is formed as a power-split transmission. The range-change transmission device 10 is provided constructively for switching fourteen transmission gears G1-G14. The range-change transmission device 10 has a rear-mounted group. The rear-mounted group is formed as a range group. The range group is provided to switch between at least two, in the present case between three, gear groups. The range-change transmission device 10 has a front-mounted group.

The range-change transmission device 10 comprises an input shaft 12. The input shaft 12 is attached to a second planetary gear set P2 of the range-change transmission device 10. The input shaft 12 is provided for attachment to a coupling K1, in particular a load-switching coupling. The input shaft 12 is provided on the drive side in relation to an attachment to a coupling K1, in particular a load-switching coupling. The range-change transmission device 10 can be connected to the drive unit 40 via a coupling K1, in particular a power shifting coupling. The range-change transmission device 10 has a transmission output shaft 18. The transmission output shaft 18 is arranged coaxially in relation to the input shaft 12. The transmission output shaft 18 is provided for attachment to a planetary gear set, in particular a third planetary gear set P3.

The range-change transmission device 10 has an intermediate shaft 14. The intermediate shaft 14 is arranged coaxially in relation to the input shaft 12. The intermediate shaft 14 is arranged coaxially in relation to the transmission output shaft 18. The intermediate shaft 14 is arranged axially between the input shaft 12 and the transmission output shaft 18. The intermediate shaft 14 is formed as a solid shaft. The intermediate shaft 14 is attached to a first planetary gear set P1. Furthermore, the intermediate shaft 14 is attached to the second planetary gear set P2. The range-change transmission device 10 comprises a countershaft 16. The countershaft 16 is arranged offset in parallel to the input shaft 12. The countershaft 16 has a higher axial extension than the intermediate shaft 14. The countershaft 16 is formed as a solid shaft.

The range-change transmission device 10 comprises ten gear planes Z1-Z10.

The range-change transmission device 10 comprises the first planetary gear set P1. The rear-mounted group has the first planetary gear set P1. The range group has the first planetary gear set P1. The first planetary gear set P1 is formed as a simple planetary gear set. The first planetary gear set P1 is arranged in an eighth gear plane Z8 of the gear planes Z1-Z10. The first planetary gear set P1 forms the eighth gear plane Z8. The first planetary gear set P1 comprises three transmission elements P11, P12, P13.

The first planetary gear set P1 comprises a first transmission element P11. The first transmission element P11 of the first planetary gear set P1 is formed as a sun wheel. The first transmission element P11 of the first planetary gear set P1 is permanently coupled to the intermediate shaft 14 in a rotationally fixed manner.

The first planetary gear set P1 comprises a second transmission element P12. The second transmission element P12 of the first planetary gear set P1 is formed as a planetary gear carrier. The second transmission element P12 of the first planetary gear set P1 is coupled to the transmission output shaft 18. The second transmission element P12 of the first planetary gear set P1 is coupled to the transmission output shaft 18 via a gear transmission ratio. The second transmission element P12 of the first planetary gear set P1 is coupled to the transmission output shaft 18 via the third planetary gear set P3.

The second transmission element P12 of the first planetary gear set P1 is connected to an output shaft 19 in a rotationally fixed manner. The output shaft 10 is simultaneously a further input shaft into the third planetary gear set P3. The third planetary gear set P3 functions only as a further gear ratio. Alternatively, it is also very possible to connect the output shaft 19 directly to the transmission output shaft 18 in a rotationally fixed manner and to do away with the third planetary gear set P3.

The first planetary gear set P1 comprises a third transmission element P13. The third transmission element P13 of the first planetary gear set P1 is formed as a hollow wheel.

Furthermore, the first planetary gear set P1 comprises planetary wheels P14, which are mounted on the second transmission element P12 formed as a planetary gear carrier.

The range-change transmission device 10 comprises the second planetary gear set P2. The front-mounted group has the second planetary gear set P2. The second planetary gear set P2 is formed as a simple planetary gear set. The second planetary gear set P2 is arranged on a third gear plane Z3 of the gear planes Z1-Z10. The second planetary gear set P2 forms the third gear plane Z3. The second planetary gear set P2 comprises three transmission elements P21, P22, P23.

The second planetary gear set P2 comprises a first transmission element P21, which is formed as a sun wheel.

The second planetary gear set P2 comprises a second transmission element P22, which is formed as a planetary gear carrier and is permanently coupled to the input shaft 12 in a rotationally fixed manner.

The second planetary gear set P2 comprises a third transmission element P23, which is formed as a hollow wheel and is permanently coupled to the intermediate shaft 14 in a rotationally fixed manner.

Furthermore, the second planetary gear set P2 comprises planetary gears P24, which are mounted on the second transmission element P22 formed as planetary gear carriers.

A flux of force of the range-change transmission device 10, which is formed as a power-split transmission, is allocated to the second transmission element P22 of the second planetary gear set P2. At least one part of the flux of force runs across the third transmission element P23 of the second planetary gear set P2. Furthermore, the part of the flux of force runs across at least one part of the intermediate shaft 14. An optional further part of the flux of force runs across the first transmission element P13 of the second planetary gear set P2. Furthermore, the further part of the flux of force optionally runs across at least one part of the countershaft 16.

The range-change transmission device 10 comprises the third planetary gear set P3. The rear-mounted group has the third planetary gear set P3. The range group has the third planetary gear set P3. The third planetary gear set P3 is formed as a simple planetary gear set. The third planetary gear set P3 is arranged in a ninth gear plane Z9 of the gear planes Z1-Z10. The third planetary gear set P3 forms the ninth gear plane Z9. The third planetary gear set P3 comprises three transmission elements P31, P32, P33. However, in principle, it would also be conceivable that at least one planetary gear set, in particular a first, a second and/or a third planetary gear set, is formed, for example, by a double planetary gear set.

The third planetary gear set P3 comprises a first transmission element P31, which is formed as a sun wheel and is permanently coupled to the second transmission element P12 of the first planetary gear set P1 in a rotationally fixed manner.

The third planetary gear set P3 comprises a second transmission element P32, which is formed as a planetary gear carrier and is permanently coupled to the transmission output shaft 18 in a rotationally fixed manner.

The second transmission element P12 of the first planetary gear set P2 is coupled to the transmission output shaft 18 via the first transmission element P31 of the third planetary gear set P3 and via the second transmission element P32 of the third planetary gear set P3.

The third planetary gear set P3 comprises a third transmission element P33, which is formed as a hollow wheel.

Furthermore, the third planetary gear set P3 comprises planetary gears P34, which are mounted on the second transmission element P32 formed as planetary gear carriers.

A first gear plane Z1 of the gear planes Z1-Z10 lies closest to the coupling K1, in particular also the drive unit 40, in relation to the rest of the gear planes Z2-Z10. The first gear plane Z1 is formed as a simple spur gear plane. The first gear plane Z1 has a first idling wheel 46. The first idling wheel 46 of the first gear plane Z1 is arranged coaxially to the input shaft 12 and is mounted rotatably on the input shaft 12. The first idling wheel 46 of the first gear plane Z1 forms a first idling wheel 46 of the input shaft 12. The first idling wheel 46 is permanently coupled to the first transmission element in a rotationally fixed manner. The first gear plane Z1 has a second idling wheel 48. The first idling wheel 46 of the first gear plane Z1 and the second idling wheel 48 of the first gear plane Z1 form a gear plane pair of the first gear plane Z1. The first idling wheel 46 of the first gear plane Z1 and the second idling wheel 48 of the first gear plane Z1 are permanently meshingly connected to each other.

A second gear plane Z2 of the gear planes Z1-Z10 lies closest to the first gear plane Z1 in relation to the rest of the gear planes Z3-Z10. The second gear plane Z2 is formed as a simple spur gear plane. The second gear plane Z2 has an idling wheel 26, which is arranged coaxially in relation to the input shaft 12 and is rotatably mounted on the input shaft 12. The idling wheel 26 of the second gear plane Z2 forms a second idling wheel 26 of the input shaft 12. The second gear plane Z2 has a fixed wheel 28, which is arranged coaxially to the countershaft 16 and is permanently connected to the countershaft 16 in a rotationally fixed manner. The fixed wheel 28 of the second gear plane Z2 forms a first fixed wheel 28 of the countershaft 16. The idling wheel 26 of the second gear plane Z2 and the fixed wheel 28 of the second gear plane Z2 form a gear pairing of the second gear plane Z2. The idling wheel 26 of the second gear plane Z2 and the fixed wheel 28 of the second gear plane Z2 are permanently meshingly connected to each other. The idling wheel 26 of the second gear plane Z2 is permanently in engagement with the first fixed wheel 28 of the countershaft 16.

The first transmission element P21 of the second planetary gear set P2 can be coupled to the countershaft 16 in such a way that a moment, which is to be transferred starting from the second planetary gear set P2 to the countershaft 16, is channeled out of the second planetary gear set P2 on the first transmission element P21 of the second planetary gear set P2.

The first transmission element P21 of the second planetary gear set P2 can advantageously be coupled to the countershaft 16 via exactly one first transmission gear ratio U1 by means of the second gear plane Z2.

The third gear plane Z3 lies closest to the first two gear planes Z1 and Z2 in relation to the rest of the gear planes Z4-Z10. A fourth gear plane of the gear planes Z1-Z10 lies closest to the first three gear planes Z1-Z3 in relation to the rest of the gear planes Z5-Z10. The fourth gear plane Z4 is formed as a simple spur gear plane. The fourth gear plane Z4 has a first idling wheel 32, which is arranged coaxially in relation to the intermediate shaft 14 and is mounted rotatably on the intermediate shaft 14. The first idling wheel 32 of the fourth gear plane Z4 forms a first idling wheel 32 of the intermediate shaft 14. The fourth gear wheel Z4 has a second idling wheel 50. The first idling wheel 32 of the fourth gear plane Z4 and the second idling wheel 50 of the fourth gear plane Z4 form a first gear pair of the fourth gear plane Z4. The first idling wheel 32 of the fourth gear plane Z4 and the second idling wheel 50 of the fourth gear plane Z4 are permanently meshingly connected to each other. The fourth gear plane Z4 has a fixed wheel 34. The fixed wheel 34 of the fourth gear plane Z4 is arranged coaxially to the countershaft 16 and is permanently connected to the countershaft 16 in a rotationally fixed manner. The fixed wheel 34 of the fourth gear plane Z4 forms a second fixed wheel 34 of the countershaft 16. The fixed wheel 34 of the fourth gear plane Z4 forms a second gear. The first idling wheel 32 of the fourth gear plane Z4 and the fixed wheel 34 of the fourth gear plane Z4 form a second gear pair of the fourth gear plane Z4. The first idling wheel 32 of the fourth gear plane Z4 and the fixed wheel 34 of the fourth gear plane Z4 are permanently meshingly connected to each other. The first fixed wheel 32 of the intermediate shaft 14 is in permanent engagement with the second fixed wheel 34 of the countershaft 16.

A fifth gear plane Z5 of the gear planes Z1-Z10 lies closest to the first four gear planes Z1-Z4 in relation to the rest of the gear planes Z6-Z10. The fifth gear plane Z5 is formed as a simple spur gear plane. The fifth gear plane Z5 has an idling wheel 36, which is arranged coaxially to the intermediate shaft 14 and is rotatably mounted on the intermediate shaft 14. The idling wheel 36 of the fifth gear plane Z5 forms a second idling wheel 36 of the intermediate shaft 14. The fifth gear plane Z5 has a fixed wheel 52, which is arranged coaxially to the countershaft 16 and is permanently connected to the countershaft 16 in a rotationally fixed manner. The fixed wheel 52 of the fifth gear plane Z5 forms a third fixed wheel 52 of the countershaft 16. The fixed wheel 52 of the fifth gear plane Z5 forms a first gear. The idling wheel 36 of the fifth gear plane Z5 and the fixed wheel 52 of the fifth gear plane Z5 form a gear pair of the fifth gear plane Z5. The idling wheel 36 of the fifth gear plane Z5 and the fixed wheel 52 of the fifth gear plane Z5 are permanently meshingly connected to each other.

A sixth gear plane Z6 of the gear planes Z1-Z10 lies closest to the first five gear planes Z1-Z5 in relation to the rest of the gear planes Z7-Z10. The sixth gear plane Z6 is formed as a simple spur gear plane. The sixth gear plane Z6 has an idling wheel 54, which is arranged coaxially to the intermediate shaft 14 and is rotatably mounted on the intermediate shaft 14. The idling wheel 54 of the sixth gear plane Z6 forms a third idling wheel 54 of the intermediate shaft 14. The idling wheel 54 of the sixth gear plane Z6 is permanently coupled to the third transmission element P13 of the first planetary gear set in a rotationally fixed manner.

A seventh gear plane Z7 of the gear planes Z1-Z10 lies closest to the first six gear planes Z1-Z6 in relation to the rest of the gear planes Z8-Z10. The seventh gear plane Z7 is formed as a simple spur gear plane. The seventh gear plane Z7 has an idling wheel 24, which is arranged coaxially to the intermediate shaft 14 and is rotatably mounted on the intermediate shaft 14. The idling wheel 24 of the seventh gear plane Z7 forms a fourth idling wheel 54 of the intermediate shaft 14.

The idling wheel 24 of the seventh gear plane Z7 forms a second switching gear. The third transmission element P13 of the first planetary gear set P1 is permanently coupled to the idling wheel 24 of the seventh gear plane in a rotationally fixed manner.

The eighth gear plane Z8 lies closest to the first seven gear planes Z1-Z7 in relation to the rest of the gear planes Z9 and Z10. The ninth gear plane Z9 lies closest to the first eight gear planes Z1-Z8 in relation to the remaining gear plane Z10. A tenth gear plane Z10 of the gear planes Z1-Z10 is formed as a simple spur gear plane. The tenth gear plane Z10 has an idling wheel 44, which is arranged coaxially to the transmission output shaft 18 and is mounted rotatably on the transmission output shaft 18. The idling wheel 44 of the tenth gear plane Z10 forms a third switching gear. The third transmission element P33 of the third planetary gear set P3 is permanently coupled to the idling wheel 44 of the tenth gear plane Z10 in a rotationally fixed manner. The third transmission element P33 of the third planetary gear set P3 is permanently coupled to the third switching gear in a rotationally fixed manner.

The range-change transmission device 10 has a moment adjustment unit 20. The moment adjustment unit 20 can be coupled to the countershaft 16.

The moment adjustment device 20 can be coupled to the first transmission element P21 of the second planetary gear set P2. Here, it is particularly advantageous for the shiftability of the range-change transmission device that the first transmission element P21 of the second planetary gear set P2 is the transmission element of the second planetary gear set, via which a moment, starting from the moment adjustment unit 20, can be introduced into the second planetary gear set.

The moment adjustment unit 20 is formed as a retarder. The moment adjustment unit 20 is provided to construct a braking moment. The moment adjustment unit 20 is provided to additionally slow down the countershaft 16, such that the first transmission element P21 can also be slowed down via the countershaft 16 by means of the moment adjustment unit 20. The moment adjustment unit 20 is provided for reducing a moment transferred, in particular, via the countershaft 16. Alternatively, or additionally, a moment adjustment unit could be formed by an electric engine, wherein the electric engine can be operated as a generator for a braking effect or for driving. In addition, a countershaft could be coupled or be able to be coupled to a rotor of the moment adjustment unit. In the case of the design of the moment adjustment unit as an electric engine, the switchability of the range-change transmission device can be further improved. And moreover, in this case, a hybrid transmission can generally be featured because of the power branching property of the range-change transmission device that can easily be recognized by the person skilled in the art, in which hybrid transmission the electric engine can not only partially assume one retarding function and a function for improving the switchability, but also a driving start-up function.

However, in principle, another design of the moment adjustment unit that seems useful for a person skilled in the art would also be conceivable, such as a hydraulic pump, for example, or as a frictional brake.

The range-change transmission device 10 has the braking unit B. The braking unit B is arranged axially in front of the first gear plane Z1, when viewed in a moment flow direction 30. The braking unit B is arranged axially in front of the second planetary gear set P2, when viewed in the moment flow direction 30. The braking unit B is arranged axially in front of a second switching unit S2, when viewed in a moment flow direction 30.

The braking unit B has a rotatably mounted coupling element 56 and a coupling element 58 arranged to be fixed to the housing. The coupling element 58 arranged to be fixed to the housing is permanently connected to a transmission housing 60 in a rotationally fixed manner.

The braking unit B is provided to connect its rotatably mounted coupling element 56 to its coupling element 58 arranged to be fixed to the housing in a rotationally fixed manner. The braking unit B is provided to arrange the first transmission element P21 of the second planetary gear set P2 to be fixed to the housing. The braking unit B is provided to arrange the idling wheel 46 of the first gear plane Z1 to be fixed to the housing.

The braking unit B has two positions B0, B1. The braking unit B has an open position B0 in which the rotatably mounted coupling element 56 can be moved in relation to the coupling element 58 arranged fixed to the housing, in particular arranged at least substantially without friction. Furthermore, the braking unit B has a closed position B1 in which the rotatably mounted coupling element 56 is connected to the coupling element 58 arranged fixed to the housing in a rotationally fixed manner. In the closed position B1, the first transmission element P21 of the second planetary gear set P2 is arranged fixed to the housing. In the closed position B1, the idling wheel 46 of the first gear plane Z1 is arranged to be fixed to the housing.

The braking unit B is advantageously formed as a constant mesh braking unit. The braking unit is advantageously formed as a constant mesh braking unit because of the combination with the moment adjustment unit 20. The moment adjustment unit 20 is formed to slow down the first transmission element P21 of the second planetary gear set P2. The braking unit B formed as the constant mesh braking unit can advantageously be closed after a rotational frequency of the first transmission element P21 of the second planetary gear set P2 was reduced to zero by means of the moment adjustment unit 20.

The range-change transmission device 10 comprises a multitude of switching units S1-S6. The range-change transmission device 10 comprises six switching units S1-S6. The range-change transmission device 10 has a first switching unit S1, which is formed to interlock the first planetary gear set P1 and is also formed to arrange the third transmission element P13 of the first planetary gear set P1 to be fixed to the housing. In the exemplary embodiment, the first switching unit S1 is formed as a double switching element. Alternatively, the first switching unit S1 can also be carried out in two separate parts, wherein then a first part is formed to interlock the first planetary gear set P1 and a second part is formed to arrange the third transmission element P13 of the first planetary gear set P1 to be fixed to the housing.

In the exemplary embodiment, an axial arrangement of the first switching unit S1 is as follows: when view in the moment flow direction 30, the first switching unit S1 is arranged axially in front of the sixth gear plane Z6, axially behind the fifth gear plane Z5, axially in front of the first planetary gear set P1, axially after the second planetary gear set P2, and axially between the first planetary gear set P1 and the second planetary gear set P2. The first switching unit S1 is arranged coaxially to the intermediate shaft 14.

The first switching unit S1 is advantageously formed as a constant mesh switching unit. The first switching unit S1 has a switching element 62, which is advantageously formed as a constant mesh switching element. The switching element 62 of the first switching unit S1 is formed to be axially shiftable via an actuator (not visible in more detail). The first switching unit S1 has three coupling elements 64, 66, 68. A first coupling element 64 of the coupling elements 64, 66, 68 of the first switching unit S1 is arranged axially in front of a second coupling element 66 of the coupling elements 64, 66, 68 of the first switching unit S1, when viewed in the moment flow direction 30. The first switching unit S1 has three switching positions S11, S1N, S12.

The first switching unit S1 has a first switching position S11. The first switching unit S1 is provided to interlock the first planetary gear set P1 in the first switching position S11 of the first switching unit S1. The first switching unit S1 is provided to couple the first transmission element P11 of the first planetary gear set P1 to the third transmission element P13 of the first planetary gear set P1 in a rotationally fixed manner in the first switching position S11 of the first switching unit S1. The first coupling element 64 of the first switching unit S1 is permanently coupled to the intermediate shaft 14 in a rotationally fixed manner and is permanently coupled to the first transmission element P11 of the first planetary gear set P1, in particular via the intermediate shaft 14, in a rotationally fixed manner. The second coupling element 66 of the first switching unit S1 is permanently coupled to the third transmission element P13 of the first planetary gear set P1 in a rotationally fixed manner and is permanently coupled to the idling wheel 24 of the seventh gear plane Z7. In the first switching position 511 of the first switching unit S1, the first coupling element 64 of the first switching unit S1 and the second coupling element 66 of the first switching unit S1 are coupled via the switching element 62 of the first switching unit S1.

The first switching unit S1 has a second switching position S12. The first switching unit S1 is provided to arrange the third transmission element P13 of the first planetary gear set P1 to be fixed to the housing in the second switching position S12 of the first switching unit S1. The first switching unit S1 is provided to arrange the idling wheel 24 of the seventh gear plane Z7 to be fixed to the housing in the second switching position S12 of the first switching unit S1. The third coupling element 68 of the first switching unit S1 is permanently connected to the transmission housing 60 in a rotationally fixed manner. In the second switching position S12 of the first switching unit S1, the second coupling element 66 of the first switching unit S1 and the third coupling element 68 of the first switching unit S1 are coupled via the switching element 62 of the first switching unit S1.

The first switching unit S1 has a neutral switching position S1N in which the first switching unit S1 is without function. In the neutral switching position S1N of the first switching unit S1, there is no coupling of the coupling elements 64, 66, 68 of the first switching unit S1 by means of the switching element 62 of the first switching unit S1. In the neutral switching position S1N of the first switching unit S1, the switching element 62 of first switching unit S1 is only coupled to the second coupling element 66 of the first switching unit S1.

The range-change transmission device 10 comprises the second switching unit S2.

The second switching unit S2 is advantageously formed to couple the first transmission element P21 of the second planetary gear set P2 with the countershaft 16. In the exemplary embodiment, the second switching unit S2 is arranged coaxially in relation to the input shaft 12. Alternatively, the second switching unit S2 could also be arranged coaxially in relation to the countershaft 16.

The second switching unit S2 is advantageously formed to couple the first transmission element P21 of the second planetary gear set P2 via the second gear plane Z2 to the countershaft 16.

When viewed in the moment flow direction 30, the second switching unit S2 is arranged axially in front of the second planetary gear set S2 and axially behind the second gear plane Z2. The second switching unit S2 is arranged coaxially in relation to the input shaft 12.

The second switching unit S2 is advantageously formed as a constant mesh switching unit. The second switching unit S2 has a switching element 70. The second switching unit S2 has three coupling elements 72, 74, 76. A first coupling element 72 of the coupling elements 72, 74, 76 of the second switching unit S2 is permanently coupled to the idling wheel 26 of the second gear plane Z2 in a rotationally fixed manner. A second coupling element 74 of the coupling elements 72, 74, 76 of the second switching unit S2 is permanently coupled to the first transmission element P21 of the second planetary gear set P2 in a rotationally fixed manner. A third coupling element 76 of the coupling elements 72, 74, 76 of the second switching unit S2 is permanently coupled to the second transmission element P22 of the second planetary gear set P2 in a rotationally fixed manner.

The second switching unit S2 has three switching positions S21, S2N, S22.

The second switching unit S2 has a first switching position S21. The second switching unit S2 is provided to couple the first transmission element P21 of the second planetary gear set P2 to the countershaft 16 in a rotationally fixed manner in the first switching position S21 of the second switching unit S2. The first transmission element P21 of the second planetary gear set P2 can be coupled to the idling wheel 26 of the second gear plane Z2 via the second switching unit S2. In the first switching position S21 of the second switching unit S2, the first coupling element 72 of the second switching unit S2 and the second coupling element 74 of the second switching unit S2 are coupled via the switching element 70 of the second switching unit S2.

The second switching unit S2 has a second switching position S22. The second switching unit S2 is provided to interlock the second planetary gear set P2 in the second switching position S22 of the second switching unit S2. The second switching unit S2 is provided to couple the first transmission element P21 of the second planetary gear set P2 to the second transmission element P22 of the second planetary gear set P2 in a rotationally fixed manner in the second switching position S22 of the second switching unit S2. In the second switching position S22 of the second switching unit S2, the second coupling element 74 of the second switching unit S2 and the third coupling element 76 of the second switching unit S2 are coupled via the switching element 70 of the second switching unit S2.

In this exemplary embodiment, the second switching unit S2 is designed as a double switching unit. Alternatively, and in an equivalent manner, the second switching unit S2 can also be formed in a divided form, wherein a first part achieves the first switching position S21 and a second part achieves the second switching position S22.

The second switching unit S2 has a neutral switching position S2N.

The range-change transmission device 10 comprises a third switching unit S3.

The third switching unit S3 is advantageously provided to couple the countershaft 16 to the third transmission element P13 of the first planetary gear set P1. The third switching unit S3 is particularly advantageously provided to couple the first element P21 of the second planetary gear set P2 to the third transmission element P13 of the first planetary gear set P1 via the countershaft 16.

In the exemplary embodiment, the switching unit S3 is advantageously arranged coaxially to the countershaft 16. Yet the switching unit S3 can also alternatively be arranged coaxially to the intermediate shaft 14.

The third switching unit S3 is advantageously arranged axially behind the fifth gear plane Z5, when viewed in the moment flow direction 30. The third switching unit S3 is arranged coaxially to the countershaft 16 and is arranged axially shiftably on the countershaft 16.

The third switching unit S3 has three switching positions S31, S3N, S32. The third switching unit S3 is provided to change between the switching positions S31, S3N, S32 by means of axial shifting. The third switching unit S3 has a first switching position S31. The third switching unit S3 has a neutral switching position S3N. The third switching unit S3 has a second switching position S32.

The third switching unit S3 has a first switching gear 22, which is axially arranged shiftably on the countershaft 16 and is permanently arranged on the countershaft 16 in a rotationally fixed manner. The first switching gear 22 of the third switching unit S3 is coaxially arranged on the countershaft 16. The first switching gear 22 of the third switching unit S3 can be brought into engagement with the second switching gear 24 of the seventh gear plane Z7. The first switching gear 22 of the third switching unit S3 is in engagement with the second switching gear 24 of the seventh gear plane Z7 in the first switching position S31. The first switching gear 22 is formed as a third gear.

The countershaft 16 can be coupled to the third transmission element P13 of the first planetary gear set P1 via exactly one second gear transmission ratio U2 by means of the first switching gear 22 of the third switching unit S3 and the second switching gear 24 of the seventh gear plane Z7.

Since, by means of the second gear plane Z2, the first transmission element P21 of the second planetary gear set P2 can be coupled to the countershaft 16 via exactly one, namely the first, gear transmission ratio U1 and since the countershaft 16 can be coupled to the third transmission element (P13) of the first planetary gear set P1 via exactly one, namely the second, gear transmission ratio U2, the first transmission element P21 of the second planetary gear set P2 can be coupled to the third transmission element P13 of the first planetary gear set P1 according to the invention via exactly two gear transmission ratios U1 and U2 via the countershaft 16.

Thus, the third transmission element P13 of the first planetary gear set P1 can be braked, particularly advantageously, by means of the first switching unit S1, and the third transmission element P13 of the first planetary gear set is not connected to the output shaft 19 of the first planetary gear set P1 in a rotationally fixed manner, but the third transmission element P13 is coupled to the output shaft 19 via the second transmission element P12.

The third switching unit S3 is provided to couple the countershaft 16 to the third transmission element P13 of the first planetary gear set P1. The third switching unit P13 is provided to couple the countershaft 16 to the second transmission element P13 of the first planetary gear set P1 in the first switching position S31.

The third switching unit S3 has a fourth switching gear 78, which is axially arranged shiftably on the countershaft 16 and is permanently arranged on the countershaft 16 in a rotationally fixed manner. The fourth switching gear 78 of the third switching unit S3 is arranged coaxially to the countershaft 16. The fourth switching gear 78 of the third switching unit S3 is coaxially arranged in relation to the countershaft 16. The fourth switching gear 78 of the third switching unit S3 is permanently connected to the first switching gear 78 of the third switching unit S3 in a rotationally fixed manner. The fourth switching gear 78 of the third switching unit S3 has a fixed axial distance in relation to the first switching gear 22 of the third switching unit S3. The fourth switching gear 78 of the third switching unit S3 can be brought into engagement with the third idling wheel 44 of the tenth gear plane Z10. The fourth switching gear 78 of the third switching unit S3 is in engagement with the third idling wheel 44 of the tenth gear plane Z10 in the second switching position S32. The third switching unit S3 is provided to couple the countershaft 16 to the third transmission element P33 of the third planetary gear set in a rotationally fixed manner.

The third switching unit S3 is provided to couple the countershaft 16 to the third transmission element P33 of the third planetary gear set P1 in a rotationally fixed manner in the second switching position S32.

The third switching unit S3 has a neutral switching position S3N, in which the first switching unit S3 is without function. As depicted in FIG. 2, none of the switching gears 22, 78 are in engagement with another gear in the neutral switching position S3N of the first switching unit S3.

The range-change transmission device 10 has a fourth switching unit S4.

The fourth switching unit S4 is advantageously provided to couple the countershaft 16 to the intermediate shaft 14 via at least one transformation ratio.

When viewed in the moment flow direction 30, the fourth switching unit S4 is arranged axially in front of the fifth gear plane Z5, axially after the fourth gear plane Z4, axially arranged in front of the first planetary gear set P1, and axially after the second planetary gear set P2. The fourth switching unit S4 is arranged coaxially to the intermediate shaft 14.

The fourth switching unit S4 is formed as a constant mesh switching unit. The fourth switching unit S4 has a switching element 82. The fourth switching unit S4 has three coupling elements 84, 86, 88.

In the exemplary embodiment, the fourth switching unit S4 has a first switching position S41 for a coupling of the countershaft 16 to the intermediate shaft 14 via a first gear transmission ratio. The fourth switching unit S4 is provided to couple the first idling wheel 32 of the intermediate shaft 14 to the intermediate shaft 14 in a rotationally fixed manner in the first switching position S41 of the fourth switching unit S4. A first coupling element 84 of the coupling elements 84, 86, 88 of the fourth switching unit S4 is permanently coupled to the first idling wheel 32 of the intermediate shaft 14 in a rotationally fixed manner. A second coupling element 86 of the coupling elements 84, 86, 88 of the fourth switching unit S4 is permanently coupled to the intermediate shaft 14 in a rotationally fixed manner. The second coupling element 86 of the fourth switching unit S4 is permanently coupled to the first transmission element P11 of the first planetary gear set P1, in a rotationally fixed manner, in particular via the intermediate shaft 14. In the first switching position S41 of the fourth switching unit S4, the first coupling element 84 of the fourth switching unit S4 and the second coupling element 86 of the fourth switching unit S4 are coupled via the switching element 82 of the fourth switching unit S4.

In the exemplary embodiment, the fourth switching unit S4 has a second switching position for a coupling of the countershaft 16 to the intermediate shaft 14 via a second transformation ratio. The fourth switching unit S4 is provided to couple the second idling wheel 36 of the intermediate shaft 14 to the intermediate shaft 14 in a rotationally fixed manner in the second switching position S43 of the fourth switching unit S4. A third coupling element 88 of the coupling elements 84, 86, 88 of the fourth switching unit S4 is permanently coupled to the second idling wheel 36 of the intermediate shaft 14 in a rotationally fixed manner. In the second switching position S42 of the fourth switching unit S4, the second coupling element 86 of the fourth switching unit S4 and the third coupling element 88 of the fourth switching unit S4 are coupled via the switching element 82 of the fourth switching unit S4.

The fourth switching unit S4 has a neutral switching position S4N. A switching of the switching element 82 of the fourth switching unit S4 with the coupling elements 84, 86, 88 of the fourth switching unit S4 is formed analogously to a switching of the switching element 62 of the first switching unit S1 with the coupling elements 64, 66, 68 of the first switching unit S1.

The range-change transmission device 10 has a fifth switching unit S5.

The fifth switching unit S5 is formed to interlock the third planetary gear set P3 and is also formed to arrange the third transmission element P33 of the third planetary gear set P3 in a manner fixed to the housing. In the exemplary embodiment, the fifth switching unit S5 is formed as a double switching element. Alternatively, the fifth switching unit S5 can also be designed in two separate parts, wherein then a first part is formed to interlock the third planetary gear set P3, and a second part is formed to arranged the third transmission element P33 of the third planetary gear set P3 in a manner fixed to the housing.

When viewed in the moment flow direction 30, the fifth switching unit S5 is advantageously arranged axially behind the tenth gear plane Z10 and arranged axially behind the third planetary gear set P3. The fifth switching unit S5 is arranged coaxially to the transmission output shaft 18.

The fifth switching unit S5 is formed as a constant mesh switching unit. The fifth switching unit S5 has a switching element 90. The switching element 90 of the fifth switching unit S5 corresponds to the switching element 62 of the first switching unit S1. The fifth switching unit S5 has three coupling elements 92, 94, 96. A first coupling element 92 of the coupling elements 92, 94, 96 of the fifth switching unit S5 is arranged axially in front of a second coupling element 94 of the coupling elements 92, 94, 96 of the fifth switching unit S5, when viewed in the moment flow direction 30. The second coupling element 94 of the fifth switching unit S5 is arranged axially in front of a third coupling element 96 of the coupling elements 92, 94, 96 of the fifth switching unit S5, when viewed in the moment flow direction 30. The fifth switching unit S5 has three switching positions S51, S5N, S52.

The fifth switching unit S5 has a first switching position S51. The fifth switching unit S5 is provided to arrange the third transmission element P33 of the third planetary gear set P3 to be fixed to the housing in the first switching position S51 of the fifth switching unit S5. The fifth switching unit S5 is provided to arrange the idling wheel 44 of the tenth gear plane Z10 to be fixed to the housing in the first switching position S51 of the fifth switching unit S5. The first coupling element 92 of the fifth switching unit S5 is arranged fixed to the housing. The first coupling element 92 of the fifth switching unit S5 is permanently connected to the transmission housing 60 in a rotationally fixed manner. The second coupling element 94 of the fifth switching unit S5 is permanently coupled to the third transmission element P33 of the third planetary gear set P3 in a rotationally fixed manner. The second coupling element 94 of the fifth switching unit S5 is permanently coupled to the idling wheel 44 of the tenth gear plane Z10 in a rotationally fixed manner. In the first switching position S51 of the fifth switching unit S5, the first coupling element 92 of the fifth switching unit S5 and the second coupling element 94 of the fifth switching unit S5 are coupled via the switching element 90 of the fifth switching unit S5.

The fifth switching unit S5 has a second switching position S52. The fifth switching unit S5 is provided to interlock the third planetary gear set P3 in the second switching position S52 of the fifth switching unit S5. The fifth switching unit S5 is provided to couple the first transmission element P31 of the third planetary gear set P3 to the third transmission element P33 of the third planetary gear set P3 in a rotationally fixed manner in the second switching position S52 of the fifth switching unit S4. The third coupling element 96 of the fifth switching unit S5 is permanently coupled to the transmission output shaft 19 in a rotationally fixed manner. In the second switching position S52 of the fifth switching unit S5, the first coupling element 92 of the fifth switching unit S5 and the second coupling element 94 of the fifth switching unit S5 are coupled via the switching element 90 of the fifth switching unit S5.

The fifth switching unit S5 has a neutral switching position S5N. A switching of the switching element 90 of the fifth switching unit S5 with the coupling elements 92, 94, 96 of the fifth switching unit S5 is formed analogously to a switching of the switching element 62 of the first switching unit S1 with the coupling elements 64, 66, 68 of the first switching unit S1.

The range-change transmission device 10 has a sixth switching unit S6. The sixth switching unit is formed to couple the moment adjustment unit 20 to the first transmission element P21 of the second planetary gear set P2.

The sixth switching unit S6 is additionally formed to couple the moment adjustment unit 20 to the countershaft 16.

The sixth switching unit S6 is arranged axially in front of the second planetary gear set P2, when viewed in the moment flow direction 30. The sixth switching unit S6 is arranged behind the first gear plane Z1, when viewed in the moment flow direction 30. The sixth switching unit S6 is arranged behind the first gear plane Z1 in the moment flow direction 30. The sixth switching unit S6 is arranged offset to the input shaft 12. The sixth switching unit S6 is arranged offset to the countershaft 16.

The sixth switching unit S6 is formed as a constant mesh switching unit. The sixth switching unit S6 has a switching element 98. The sixth switching unit S6 has three coupling elements 100, 102, 104. A first coupling element 100 of the coupling elements 100, 102, 104 of the sixth switching unit S6 is arranged axially in front of a second coupling element 102 of the coupling elements 100, 102, 104 of the sixth switching unit S6, when viewed in the moment flow direction 30. The second coupling element 102 of the sixth switching unit S6 is arranged axially in front of a third coupling element 104 of the coupling elements 100, 102, 104 of the sixth switching unit S6, when viewed in the moment flow direction 30. The sixth switching nit S6 has three switching positions S61, S6N, S62.

The sixth switching unit S6 has a first switching position S61. The sixth switching unit S6 is provided to couple the second idling wheel 48 of the first gear plane Z1 to the moment adjustment unit 20 in a rotationally fixed manner in the first switching position S61 of the sixth switching unit S6.

The sixth switching unit S6 is provided to couple the moment adjustment unit 20 to the first transmission element P21 of the second planetary gear set P2 via the gear pair of the first gear plane Z1 in the first switching position S61 of the sixth switching unit S6.

The first coupling element 100 of the sixth switching unit S6 is permanently coupled to the second idling wheel 48 of the first gear plane Z1 in a rotationally fixed manner. The second coupling element 102 of the sixth switching unit S6 is permanently coupled to the moment adjustment unit 20 in a rotationally fixed manner. In the first switching position S61 of the sixth switching unit S6, the first coupling element 100 of the sixth switching unit S6 and the second coupling element 102 of the sixth switching unit S6 are coupled via the switching element 98 of the sixth switching unit S6.

The sixth switching unit S6 has a second switching position S62. The sixth switching unit S6 is provided to couple the second idling wheel 50 of the fourth gear plane Z4 to the moment adjustment unit 20 in a rotationally fixed manner in the second switching position S62 of the sixth switching unit S6. The sixth switching unit S6 is provided to couple the moment adjustment unit 20 to the countershaft 16 in the second switching position S62 of the sixth switching unit S6. The sixth switching unit S6 is provided to couple the moment adjustment unit 20 to the countershaft 16 via the first gear pair of the fourth gear plane Z4 and via the second gear pair of the fourth gear plane Z4 in the second switching position S62 of the sixth switching unit S6. The third coupling element 104 of the sixth switching unit S6 is permanently coupled to the second idling wheel 50 of the fourth gear plane Z4 in a rotationally fixed manner.

The sixth switching unit S6 has a neutral switching position S6N. A switch of the switching element 98 of the sixth switching unit S6 with the coupling elements 100, 102, 104 of the sixth switching unit S6 is formed analogously to a switch of the switching element 62 of the first switching unit S1 with the coupling elements 64, 66, 68 of the first switching unit S1.

A switching strategy for switching the braking unit B and the first five switching units S1-S5 can be seen in the table in FIG. 3. Fourteen transmission gears G1-G14 can be switched, in particular a first transmission gear G1, a second transmission gear G2, a third transmission gear G3, a fourth transmission gear G4, a fifth transmission gear G5, a sixth transmission gear G6, a seventh transmission gear G7, an eighth transmission gear G8, a ninth transmission gear G9, a tenth transmission gear G10, an eleventh transmission gear G11, a twelfth transmission gear G12, a thirteenth transmission gear G13, and a fourteenth transmission gear G14. The reference numerals of the transmission gears G1-G14 are sorted according to the descending transmission of the transmission gears G1-G14. A mark in the corresponding line respectively means that the braking unit B is in the position B0, B1 corresponding to the column or the corresponding switching unit S1-S5 is in the switching position S11, S1N, S12, S21, S2N, S22, S31, S3N, S32, S41, S4N, S42, S51, S5N, S52 corresponding to the column in order to respectively switch the transmission gear G1-G14 shown in the first column.

The transmission gears G1-G14 are allocated to several gear groups. The transmission gears G1-G14 are allocated of the three gear groups. Two switching units S1, S5 of the switching units S1-S6 are provided for switching the gear groups. The first switching unit S1 is provided for switching the gear groups. Furthermore, the fifth switching unit S5 is provided for switching the gear groups.

A first gear group of the gear groups comprises the first transmission gear G1, the second transmission gear G2, the third transmission gear G3 and the fourth transmission gear G4. In the second switching position S12 of the first switching unit S1, a transmission gear G1-G4 of the first gear group is switched. In the combined second switching position S12 of the first switching unit S1 and first switching position S51 of the fifth switching unit S5, a transmission gear G1-G4 of the first gear group is switched. With the transmission gears G1-G4 of the first gear groups, the rear-mounted group, in particular the first planetary gear set P1 and the third planetary gear set P3, are in a range-low position.

A second gear group of the gear groups comprises the fifth transmission gear G5, the sixth transmission gear G6, the seventh transmission gear G7, the eighth transmission gear G8 and the ninth transmission gear G9. The transmission gears G5-G9 of the second gear group have a lower transformation ratio than the transmission groups G1-G4 of the first gear group. In the combined first switching position S11 of the first switching unit S1 and first switching position S51 of the fifth switching unit S5, a transmission gear G5-G9 of the second gear group is switched. With the gear groups G5-G9 of the second gear group, the planetary gear set of the rear-mounted group, in particular the first planetary gear set P1, is in a range-high position and a further planetary gear set of the rear-mounted group, in particular the third planetary gear set P3, in a range-low position.

Furthermore, a third gear group has the tenth transmission gear G10, the eleventh transmission gear G11, the twelfth transmission gear G12, the thirteenth transmission gear G13 and the fourteenth transmission gear G14. The transmission gears G10-G14 of the third gear group have a lower transformation ratio than the transmission gears G1-G4 of the first gear group. The transmission gears G10-G14 of the third gear group have a lower transformation ratio than the transmission gears G1-G4 of the second gear group. In the second switching position S52 of the fifth switching unit S5, a transmission gear G10-G14 of the third gear group is switched. In a combined first switching position S11 of the first switching unit S1 and second switching position S52 of the fifth switching unit S5, a transmission gear G10-G14 of the third gear group is switched. With the transmission gears G10-G14 of the third gear group, the rear-mounted group, in particular the first planetary gear set P1 and the third planetary gear set P3, are in a range-high position.

In the first switching position S11 of the first switching unit S1, a transmission gear G5-G14 of the second gear group or the third transmission gear group is switched. In the first switching position S51 of the fifth switching unit S5, a transmission gear G1-G9 of the first gear group or the second gear group is switched.

The braking unit B is provided for switching transmission gears G1-G14 within one of each of the gear groups. Three switching units S2-S4 of the switching units S1-56 are provided for switching the transmission gears G1-G14 within each of the gear groups. The second switching unit S2 is provided for switching the transmission gears G1-G14 within each of the gear groups. The third switching unit S3 is provided for switching the transmission gears G1-G14 within each of the gear groups. The fourth switching unit S4 is provided for switching the transmission gears G1-G14 within each of the gear groups.

In a highest transmission gear G4, G9, G14 of each gear group, the braking unit B is in the closed position B1. In the highest transmission gear G4, G9, G14 of each gear group, the three switching units S2-S4 are in a neutral switching position S2N, S3N, S4N of the three switching units S2-S4. In the highest transmission gear G4, G9, G14 of each gear group, the second switching unit S2 is in the neutral switching position S2N of the second switching unit S2. In the highest transmission gear G4, G9, G14 of each gear group, the third switching unit S3 is in the neutral switching position S3N of the third switching unit S3. In the highest transmission gear G4, G9, G14 of each gear group, the fourth switching unit S4 is in the neutral switching position S4N of the fourth switching unit S4. The highest gear group G4, G9, G14 of each gear group is transformed at least by the second planetary gear set P2 as an overdrive gear.

In a second highest transmission gear G3, G8, G13 of each gear group, the braking unit B is in the open position B0. In the second highest transmission gear G3, G8, G13 of each gear group, the second switching unit S2 is in the second switching position S22 of the second switching unit S2. In the second highest transmission gear G3, G8, G13 of each gear group, the third switching unit S3 is in the neutral switching position S3N of the third switching unit S3. In the second highest transmission gear G3, G8, G13 of each gear group, the fourth switching unit S4 is in the neutral switching position S4N of the fourth switching unit S4. The second highest transmission gear G3, G8, G13 of each gear group is transformed at least by the second planetary gear set P2 as a direct gear.

In a third highest transmission gear G2, G7, G12 of each gear group, the braking unit B is in the open position B0. In the third highest transmission gear G2, G7, G12 of each gear group, the second switching unit S2 is in the first switching position S21 of the second switching unit S2. In the third highest transmission gear G2, G7, G12 of each gear group, the third switching unit S3 is in the neutral switching position S3N of the third switching unit S3. In the third highest transmission gear G2, G7, G12 of each gear group, the fourth switching unit S4 is in the second switching position S42 of the fourth switching unit S4. The third highest transmission gear G2, G7, G12 of each gear group is transformed at least by the second planetary gear set P2 as a reduction gear.

In a fourth highest transmission gear G1, G6, G11 of each gear group, the braking unit B is in the open position B0. In the fourth highest transmission gear G1, G6, G11 of each gear group, the second switching unit S2 is in the first switching position S21 of the second switching unit S2. In the fourth highest transmission gear G1, G6, G11 of each gear group, the third switching unit S3 is in the neutral switching position S3N of the third switching unit S3. In the fourth highest transmission gear G1, G6, G11 of each gear group, the fourth switching unit S4 is in the first switching position S41 of the fourth switching unit S4. The fourth highest transmission gear G1, G6, G11 of each gear group is transformed at least by the second planetary gear set P2 as a reduction gear.

In a fifth highest transmission gear G5, G10 of the second gear group and the third gear group, the braking unit B is in the open position B0. In the fifth highest transmission gear G5, G10 of the second gear group and the third gear group, the second switching unit S2 is in the first switching position S21 of the second switching unit S2. In the fifth highest transmission gear G5 of the second gear group, the third switching unit S3 is in the first switching position S31 of the third switching unit S3. In the fifth highest transmission gear G10 of the third gear group, the third switching unit S3 is in the second switching position S32 of the third switching unit S3. In the fifth highest transmission gear G5, G10 of the second gear group and the third gear group, the fourth switching unit S4 is in the neutral switching position S4N of the fourth switching unit S4. The fifth highest transmission gear G5, G10 of each gear group is transformed at least by the second planetary gear set P2 as a reduction gear. There is no need for a fifth highest transmission gear for the first gear group.

Any two of the transmission gears G1-G14, which are arranged in adjacent lines in the table of FIG. 3, are formed to be power-shiftable. Any two of the transmission gears G1-G14 within each gear group, which are arranged in adjacent lines in the table of FIG. 3, are formed to be power-shiftable. The highest transmission gear G4 of the first gear group and a lowest transmission gear G5 of the second gear group are formed to be power-shiftable.

A gear change from the fourth transmission gear G4 formed as the highest transmission gear of the first gear group into the fifth transmission gear G5 formed as the lowest transmission gear of the second gear group is described below. Here, a transition of the transformation ratio of the first planetary gear set P1 from the range-low position to the range-high position takes place.

In a first switching step of the gear change, the third switching unit S3 is provided to transfer from the neutral switching position S3N of the third switching unit S3 into the first switching position S31 of the third switching unit S3, such that the countershaft 16 is coupled to the third transmission element P13 of the first planetary gear set P1 in a manner transferring the torque. Here, the second switching unit S2 and the fourth switching unit S4 are in the neutral position S2N, S4N, and thus no torque abuts on the countershaft 16 and the first switching gear 22. Furthermore, the second switching gear is here braked to a standstill via the first switching unit S1 in the second switching position S12.

In a second switching step of the gear change, the braking unit B is provided for opening. In the second switching step, the braking unit B is provided for transitioning from the closed position B1 into the open position B0. In the second switching step, the rotatably mounted coupling element 56 of the braking unit B is braked to be fixed to the housing via the second switching unit S2 in the first switching position S21, via the gear pair of the second gear plane Z2, via the countershaft 16, via the third switching unit S3 in the first switching position S31 and via the first switching unit S1 in the second switching position S12.

In order to introduce a switch of the first switching unit S1, a torque on the intermediate shaft 14 must be reduced by braking, in particular using the moment adjustment unit 20, or the torque on the countershaft 16 is increased by driving, until the switching element 62 formed as a constant mesh switching element 62 of the first switching unit S1 on the third transmission element P13 of the first switching unit S1 becomes load-free in relation to the transmission housing 60.

In a third switching step of the gear change, the first switching unit S1 is provided to transition from the second switching position S12 of the first switching unit S1 into the neutral switching position S1N of the first switching unit S1. As a result, a movement of the third transmission element P13 of the first planetary gear set P1 is released. Furthermore, a rotational frequency adjustment of the third transmission element P13 of the first planetary gear set P1 is thus possible.

In a fourth switching step of the gear change, in particular with the same rotational frequency of the third transmission element P13 of the first planetary gear set P1 with the intermediate shaft 14, the first switching unit S1 is provided to transition from the neutral switching position S1N of the first switching unit S1 into the first switching position S11 of the first switching unit S1. This, a parallel switching of the front-mounted group and the rear-mounted group advantageously takes place.

A reverse switching from a slowest gear G5, G10 of a gear group, in particular a range high, into a quickest gear G4, G9 of a lower gear group in comparison to the gear group, in particular a range low, is described below. In a lowest gear of the front-mounted group, a flux of force takes place via a gear plane of the third transmission element P23 of the second planetary gear set P2. By decelerating the intermediate shaft 14 and/or driving the countershaft 16, for example by means of a lacuna as an electric engine, the switching element 62 formed as a constant mesh switching element of the first switching unit S1 becomes load free and can thus be brought into a neutral position S1N of the first switching unit S1. Then, a rotational frequency adjustment takes place by torque adjustment. When a rotational frequency on the front-mounted group and a rotational frequency of the second planetary gear set P2 of the front-mounted group come to a halt, the interlocking of the third transmission element P13 of the first planetary gear set P1 with the transmission housing 60 takes place. A moment engagement is raised again and the switching is ended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 10 range-change transmission device
12 input shaft
14 intermediate shaft
16 countershaft
18 transmission output shaft
19 output shaft
20 moment adjustment unit
22 switching gear
24 idling wheel
26 idling wheel
28 fixed wheel
30 moment flow direction
32 idling wheel
34 fixed wheel
36 idling wheel
38 motor vehicle
40 drive unit
42 multi-stage transmission
44 idling wheel
46 idling wheel
48 idling wheel
50 idling wheel
52 fixed wheel
54 idling wheel
56 coupling element
58 coupling element
60 transmission housing
62 switching element
64 coupling element
66 coupling element
68 coupling element
70 switching element
72 coupling element
74 coupling element
76 coupling element
78 switching gear
82 switching element
84 coupling element
86 coupling element
88 coupling element
90 switching element
92 coupling element
94 coupling element
96 coupling element
98 switching element
100 coupling element
102 coupling element
104 coupling element
G1 transmission gear
G2 transmission gear
G3 transmission gear
G4 transmission gear
G5 transmission gear
G6 transmission gear
G7 transmission gear
G8 transmission gear
G9 transmission gear
G10 transmission gear
G11 transmission gear
G12 transmission gear
G13 transmission gear
G14 transmission gear P1 planetary gear set
P11 transmission gear
P12 transmission gear
P13 transmission gear
P14 planetary wheel
P2 planetary gear set
P21 transmission element
P22 transmission element
P23 transmission element
P24 planetary wheel
P3 planetary gear set
P31 transmission element
P32 transmission element
P33 transmission element
P34 planetary wheel
B braking unit
B0 position
B1 position
K1 coupling
S1 switching unit
S11 switching position
S12 switching position
S1N switching position
S2 switching unit
S21 switching position
S22 switching position
S2N switching position
S3 switching unit
S31 switching position
S32 switching position
S3N switching position
S4 switching unit
S41 switching position
S42 switching position
S4N switching position
S5 switching unit
S51 switching position
S52 switching position
S5N switching position
S6 switching unit
S61 switching position
S62 switching position
S6N switching position
U1 first transformation ratio step
U2 second transformation ratio step
Z1 gear plane
Z2 gear plane
Z3 gear plane
Z4 gear plane
Z5 gear plane
Z6 gear plane
Z7 gear plane
Z8 gear plane
Z9 gear plane
Z10 gear plane

The invention claimed is:
1. A range-change transmission device, comprising:
a housing;
an input shaft;
an intermediate shaft;
a countershaft;
a transmission output shaft;
a first planetary gear set, which has a first transmission element, a second transmission element, a third transmission element; and
an output shaft configured to channel a torque out of the first planetary gear set, wherein the first transmission element of the first planetary gear set is coupled to the intermediate shaft in a rotationally fixed manner, wherein the second transmission element of the first planetary gear set is coupled to the output shaft of the first planetary gear set in a rotationally fixed manner, wherein the output shaft is coupled to the first planetary gear set either directly in a rotationally fixed manner or via a transformation ratio step connected in series, wherein the range-change transmission device further comprises a first switching unit configured to arrange the third transmission element of the first planetary gear set fixed to the housing in at least one switching position, and a second planetary gear set, which has a first transmission element, a second transmission element and a third transmission element, wherein the third transmission element of the second planetary gear set is coupled to the intermediate shaft in a rotationally fixed manner, and the second transmission element of the second planetary gear set is coupled or can be coupled to the input shaft in a rotationally fixed manner, wherein the first transmission element of the second planetary gear set is coupled to the counter shaft in such a way that, on the first transmission element of the second planetary gear set, a torque can be channelled out of the second planetary gear set to the countershaft, and wherein the countershaft is coupled to the third transmission element of the first planetary gear set in such a way that a torque on the third transmission element of the first planetary gear set is into the first planetary gear set starting from the countershaft.

2. The range-change transmission device of claim 1, further comprising:

a braking unit configured to fix the first transmission element of the second planetary gear set to the housing.

3. The range-change transmission device of claim 2, further comprising:

a second switching unit configured to couple the first transmission element of the second planetary gear set to the countershaft in at least one switching position.

4. The range-change transmission device of claim 3, wherein the first transmission element of the second planetary gear set is coupleable in a rotationally fixed manner to an idling wheel by the second switching unit, the idling wheel being in permanent engagement with a fixed wheel of the countershaft.

5. The range-change transmission device of claim 3, wherein the second switching unit is arranged axially and, viewed in a moment flow direction, in front of the second planetary gear set.

6. The range-change transmission device of claim 5, wherein the braking unit is arranged axially and, viewed in the moment flow direction, axially in front of the second switching unit.

7. The range-change transmission device of claim 3, wherein the second switching unit is configured to interlock the second planetary gear set in a further switching position.

8. The range-change transmission device of claim 1, further comprising:

a moment adjustment unit, which is coupled or can be coupled to the first transmission element of the second planetary gear set in such a way that a torque starting from the moment adjustment unit on the first transmission element of the second planetary gear set can be introduced into the second planetary gear set.

9. The range-change transmission device of claim 1, further comprising:

a third switching unit configured to couple the countershaft to the third transmission element of the first planetary gear set.

10. The range-change transmission device of claim 1, wherein the first switching unit is configured to interlock the first planetary gear set in at least one further switching position.

11. The range-change transmission device of claim 1, further comprising:

a fourth switching unit configured to couple the intermediate shaft to the countershaft via a gear wheel plane in at least one switching position.

12. The range-change transmission device of claim 11, wherein the fourth switching unit has a neutral switching position and a second switching position, and the fourth switching unit is configured to couple the intermediate shaft to the countershaft via a further gear wheel plane in the second switching position.

13. The range-change transmission device of claim 1, wherein the first transmission element of the first planetary gear set is a sun wheel, the second transmission element of the first planetary gear set is a planetary gear carrier, and the third transmission element of the first planetary gear set is a hollow wheel.

14. The range-change transmission device of claim 1, wherein the first transmission element of the second planetary gear set is a sun wheel, and the third transmission element of the second planetary gear set is a hollow wheel.

15. A method for switching a range-change transmission device, which comprises a housing; an input shaft; an intermediate shaft; a countershaft; a transmission output shaft; a first planetary gear set, which has a first transmission element, a second transmission element, a third transmission element; and an output shaft configured to channel a torque out of the first planetary gear set, wherein the first transmission element of the first planetary gear set is coupled to the intermediate shaft in a rotationally fixed manner, wherein the second transmission element of the first planetary gear set is coupled to the output shaft of the first planetary gear set in a rotationally fixed manner, wherein the output shaft is coupled to the first planetary gear set either directly in a rotationally fixed manner or via a transformation ratio step connected in series, wherein the range-change transmission device further comprises a first switching unit configured to arrange the third transmission element of the first planetary gear set fixed to the housing in at least one switching position, wherein the range-change transmission device further comprises a second planetary gear set, which has a first transmission element, a second transmission element and a third transmission element, wherein the third transmission element of the second planetary gear set is coupled to the intermediate shaft in a rotationally fixed manner, and the second transmission element of the second planetary gear set is coupled or can be coupled to the input shaft in a rotationally fixed manner, wherein the first transmission element of the second planetary gear set is coupled to the counter shaft in such a way that, on the first transmission element of the second planetary gear set, a torque can be channelled out of the second planetary gear set to the countershaft, wherein the countershaft is coupled to the third transmission element of the first planetary gear set in such a way that a torque on the third transmission element of the first planetary gear set is into the first planetary gear set starting from the countershaft, and wherein the first switching unit is configured to interlock the first planetary gear set in at least one further switching position, the method comprising:

starting from one gear, in which the third transmission element of the first planetary gear set is arranged fixed to the housing by the first switching unit, performing an upshifting by performing the following steps in order coupling the first transmission element of the second planetary gear set to the third transmission element of the first planetary gear set via the countershaft, transferring the first switching unit into a neutral position, transferring the first switching unit into the further switching position for interlocking the first planetary gear set.

16. A motor vehicle, comprising:

a drive unit formed as a combustion engine; and a range-change transmission device, which comprises a housing;

an input shaft;

an intermediate shaft;

a countershaft;

a transmission output shaft;

a first planetary gear set, which has a first transmission element, a second transmission element, a third transmission element; and an output shaft configured to channel a torque out of the first planetary gear set, wherein the first transmission element of the first planetary gear set is coupled to the intermediate shaft in a rotationally fixed manner, wherein the second transmission element of the first planetary gear set is coupled to the output shaft of the first planetary gear set in a rotationally fixed manner, wherein the output shaft is coupled to the first planetary gear set either directly in a rotationally fixed manner or via a transformation ratio step connected in series, wherein the range-change transmission device further comprises a first switching unit configured to arrange the third transmission element of the first planetary gear set fixed to the housing in at least one switching position, and a second planetary gear set, which has a first transmission element, a second transmission element and a third transmission element, wherein the third transmission element of the second planetary gear set is coupled to the intermediate shaft in a rotationally fixed manner, and the second transmission element of the second planetary gear set is coupled or can be coupled to the input shaft in a rotationally fixed manner, wherein the first transmission element of the second planetary gear set is coupled to the counter shaft in such a way that, on the first transmission element of the second planetary gear set, a torque can be channelled out of the second planetary gear set to the countershaft, wherein the countershaft is coupled to the third transmission element of the first planetary gear set in such a way that a torque on the third transmission element of the first planetary gear set is into the first planetary gear set starting from the countershaft, wherein the range-change transmission device further comprises a moment adjustment unit, which is coupled or can be coupled to the first transmission element of the second planetary gear set in such a way that a torque starting from the moment adjustment unit on the first transmission element of the second planetary gear set can be introduced into the second planetary gear set, and a second switching unit configured to couple the first transmission element of the second planetary gear set to the countershaft in at least one switching position, wherein a crankshaft of the internal combustion engine is permanently coupled to the input shaft in a rotationally fixed manner.

* * * * *